(12) United States Patent
Campbell et al.

(10) Patent No.: US 9,998,681 B2
(45) Date of Patent: Jun. 12, 2018

(54) ELECTRONIC IRIS FOR A CAMERA

(71) Applicant: GoPro, Inc., San Mateo, CA (US)

(72) Inventors: Scott Patrick Campbell, Belmont, CA (US); Leo Baldwin, Seattle, WA (US)

(73) Assignee: GoPro, Inc., San Mateo, CA (US)

( * ) Notice: Subject to any disclaimer, the term of this patent is extended or adjusted under 35 U.S.C. 154(b) by 0 days. days.

(21) Appl. No.: 15/196,025

(22) Filed: Jun. 28, 2016

(65) Prior Publication Data

US 2017/0374255 A1    Dec. 28, 2017

(51) Int. Cl.
*H04N 5/235*    (2006.01)
*H04N 5/238*    (2006.01)

(52) U.S. Cl.
CPC .................................. *H04N 5/238* (2013.01)

(58) Field of Classification Search
CPC .. G02F 1/1334; G02F 1/13306; F21V 14/003; G03B 9/02; G09G 3/3406; H04N 5/02
See application file for complete search history.

(56) References Cited

U.S. PATENT DOCUMENTS

| | | |
|---|---|---|
| 4,572,616 A | 2/1986 | Kowel et al. |
| 6,271,899 B1 | 8/2001 | Lewis et al. |
| 6,545,739 B1 | 4/2003 | Matsumoto et al. |
| 2005/0146634 A1* | 7/2005 | Silverstein ........... H04N 5/2254 348/360 |
| 2007/0216851 A1 | 9/2007 | Matsumoto |
| 2009/0237575 A1* | 9/2009 | Tsi-shi ..................... G02B 3/14 349/1 |
| 2009/0272805 A1* | 11/2009 | Riddle ................. G03H 1/0011 235/457 |
| 2011/0102305 A1* | 5/2011 | Tamura ................ G09G 3/3233 345/80 |
| 2012/0019889 A1* | 1/2012 | Lamine ................... G02F 1/155 359/266 |
| 2016/0147091 A1* | 5/2016 | Christmann ........ H01L 27/1446 345/207 |

* cited by examiner

*Primary Examiner* — Trung Diep
(74) *Attorney, Agent, or Firm* — Young Basile Hanlon & MacFarlane, P.C.

(57) ABSTRACT

Disclosed is an electronically controlled camera iris device. The camera iris device may include a transparent conductor layer supplying an input voltage controlling the diameter of the aperture, a transparent resistance layer providing different voltages in different regions varying based on the distance from a center point, and a diaphragm layer that can be independently controlled in different regions to block or transmit light incident on the diaphragm layer when corresponding control voltages are applied on the diaphragm layer. The camera iris device can be configured to have a desired diameter by controlling a first region of the diaphragm layer to transmit the light and a second region of the diaphragm layer outside of the first region to block the light. The diaphragm layer may include a Bragg grating layer or an Electrochromic layer.

20 Claims, 7 Drawing Sheets

FIG. 1

100 Cross-section of Adaptive Camera Iris

ELECTRONIC IRIS FOR A CAMERA

BACKGROUND

Field of Art

The disclosure generally relates to the field of cameras and in particular to an electronically controllable iris for a camera.

Description of Art

A conventional camera includes an iris diaphragm that controls a size of an aperture, which regulates the amount of light that passes through the lens to the image sensor. Typically, electronic cameras include an adjustable iris diaphragm that has one or more mechanical components (e.g. a set of blades) that can be mechanically adjusted to change the size of the aperture. The conventional camera relies on physical movement of the mechanical components during the operation of the camera. However, the mechanical components of the iris diaphragm are susceptible to breakage if there is an impact to the camera, may wear over time (thus decreasing lifetime of camera), and incur limitations on the form factor of the camera due to their bulkiness.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is an electronically controlled camera iris. An electronically controlled camera iris may comprise a substantially thin optical component in a lens assembly of an electronic camera. The camera iris comprises a diaphragm that may block light and an aperture or opening at the center of the camera iris that may allow the light to pass through to the image sensor. The diameter of the aperture in the lens assembly is electronically controlled in the camera iris device presented in various embodiments of the disclosure.

In an embodiment, the camera iris device may include at least a transparent conductor layer, a transparent resistance layer, and a diaphragm layer. The transparent conductor layer may supply an input voltage to control the diameter of the aperture in the camera iris. The transparent resistance layer may be below the transparent conductor layer and may receive the input voltage at a connector point in a center region and receive a peripheral voltage at the edges. The resistance layer may provide varying control voltages in different regions that decrease with a distance from the center point. The diaphragm layer can receive the varying control voltages and may operate as a diaphragm in outer regions to block light in response to a corresponding control voltage being below a voltage threshold and to operate as an aperture in inner regions to transmit light in response to the corresponding control voltage being above the voltage threshold.

In some embodiments, the diaphragm layer includes a Bragg layer with one or more layers of a broad-band holographic polymer-dispersed liquid crystal. In alternate embodiments, the diaphragm layer includes an Electrochromic layer with one or more layers of a broad-band absorptive material.

Example Device Configuration

Figure 1:
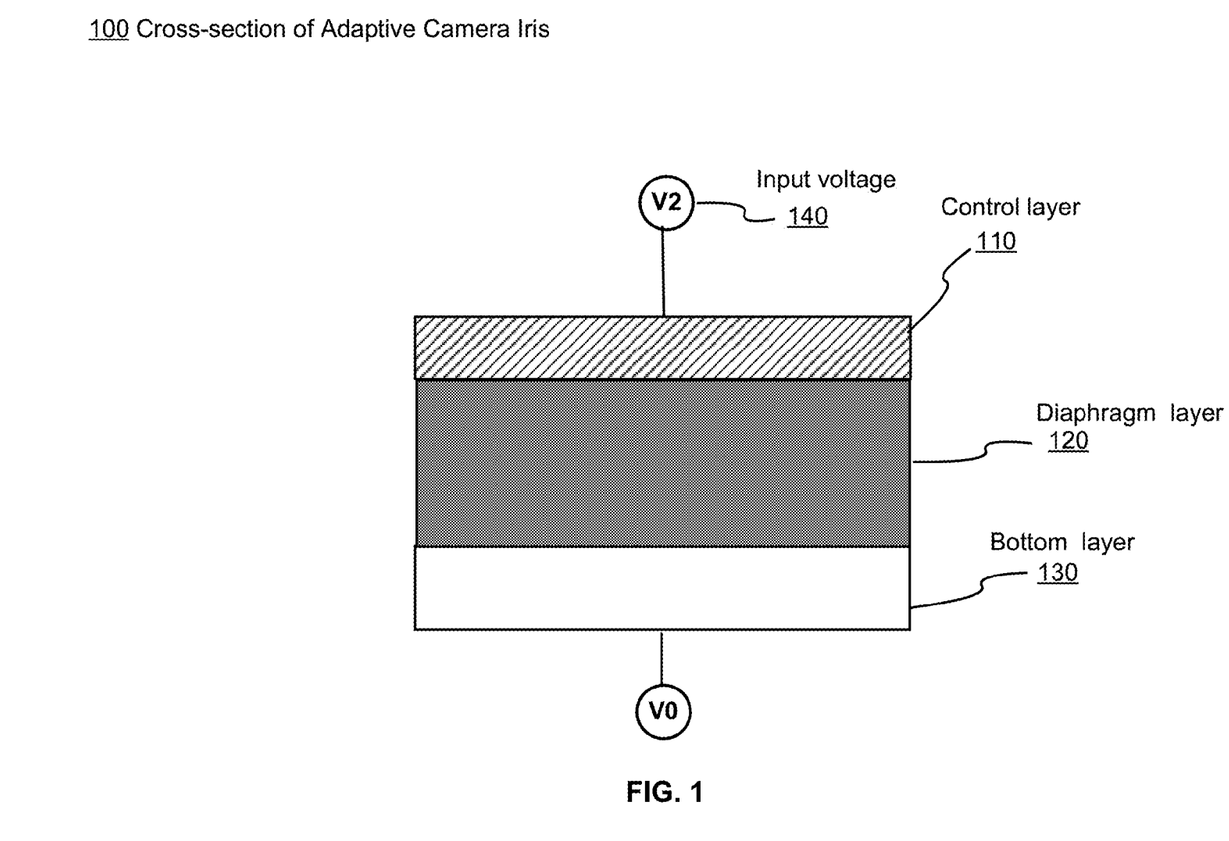
FIG. 1 is a cross-section of an adaptive camera iris, according to one embodiment.

FIG. 1 is a cross-section of an adaptive camera iris 100, according to one embodiment. The adaptive camera iris may include at least a control layer 110, a diaphragm layer 120, a bottom layer 130, and one or more input voltages (V2) 140 applied to at least the control layer 110. In an embodiment, the cross-section is through a substantially cylindrical adaptive camera iris 100 have a circular plan view when viewed from the top or bottom. Alternatively, the cross-section may be through an iris 100 having a different shape such as, for example, an iris 100 having a square, a rectangle, hexagon, octagon, or other polygon plan view when viewed from the top.

The adaptive camera iris comprises a component in the lens assembly of the camera that control an amount of light that reaches the image sensor. The adaptive camera iris may comprise a diaphragm that blocks light and an aperture that enables light to pass through to the image sensor. The size of the aperture may be electronically controllable to regulate the amount of light that passes through onto an image sensor at the moment when the shutter opens. Aperture size may be calibrated in f-numbers (e.g. f/2.0, f/8.0, etc.) which represent the amount of exposure during the opening of the shutter. For example, a lower f-number can give more exposure (or more light entering the lens) as it represents an aperture with a larger diameter. In contrast, a higher f-number can give less exposure as it represents an aperture with a smaller diameter.

The control layer 110 may comprise a first transparent conductor that allows light to pass through the control layer 110 to reach the one or more layers below. The control layer 110 may receive one or more input voltages V2 140 and generate one or more control voltages that electronically control the transmissive properties of the diaphragm layer 120. Particularly, the control layer 110 may generate control voltages that cause an outer region (e.g., outside a threshold radius) of the diaphragm layer 120 to reflect, absorb, or otherwise block light while causing an inner region (e.g., inside a threshold radius) of the diaphragm layer 120 to transmit light through the diaphragm layer 120. Thus, the inner region of the diaphragm layer 120 acts as an aperture while the outer region acts as a diaphragm or aperture stop.

The diaphragm layer 120 may comprise a transparent layer made of one or more sub-layers of materials having physical properties that enable different regions of the diaphragm layer 120 to either reflect or transmit light depending on control voltages applied to the different regions. For example, the control layer 110 may apply a radially varying voltage across the diaphragm layer 120 that causes an inner region of the diaphragm layer 120 (e.g., where the voltage exceed a threshold) to transmit light (e.g., act as an aperture) and an outer region of the diaphragm layer 120 (e.g., where the voltages are below the threshold) to reflect or absorb light (e.g., act as a diaphragm). For example, a linear or non-linear voltage gradient may be applied that decreases with distance from the center.

In another embodiment, the diaphragm layer 120 may comprise a plurality of discrete concentric rings that may each have a different voltage applied. The control voltages are set so that inner ring(s) (e.g., below a threshold diameter) of the diaphragm layer 120 transmit light (e.g., act as an aperture) while outer ring(s) (e.g., above the threshold diameter) reflect light (e.g., act as a diaphragm). For example, in an embodiment in which the diaphragm layer 120 becomes more transmissive with increased voltage, a first voltage above a threshold may be applied in the center region and a second voltage below the threshold may be applied in the outer regions.

These voltages may be varied to change the sizes of the transmissive regions, thereby controlling the size of the aperture. In some configurations, the diaphragm layer 120 may include one or more sub-layers having alternating values of high and low refractive indices. In another configuration, the diaphragm layer 120 may include one or more sub-layers with a specific value of thickness for each layer. For example, in some embodiments, the one or more sub-layers may have a thickness of one quarter of a wavelength of the light that passes through the diaphragm layer 120. In some configurations, the diaphragm layer 120 may include one or more sub-layers which can completely or partially absorb the light incident on the diaphragm layer 120.

The bottom layer 130 may represent a second transparent conductor having a voltage V0. In some embodiments, the bottom layer 130 may comprise a ground plane or other power plane. The bottom layer 130 may be positioned below the control layer 110 and the diaphragm layer 120.

The input voltage V2 140 may represent one or more voltages applied to the control layer 110. For example, the input voltage 140 may be received from a control circuit (not shown) that supplies the one or more voltages. In some embodiments, the input voltage 140 may control a desired diameter of the aperture. For example, the control layer 110 generates a voltage gradient with a voltage that varies (e.g., continuously or in discrete intervals) from a center region to the edges. In another embodiment, the control layer 110 generates a plurality of control voltages from the input voltage 140 and supplies different control voltages to different regions of the diaphragm layer 120. For example, the control layer 110 may comprise a plurality of electrically isolated conductive regions that each provides a different voltage to a corresponding region of the diaphragm layer 120. In one example, the regions of the control layer 110 may comprise multiple concentric rings of varying diameters with each ring of the control layer 110 providing a voltage to a corresponding ring of the diaphragm layer 120, so as to independently control the transmissive properties of the different rings of the diaphragm layer 120, thereby controlling the width of the aperture. In one embodiment, the multiple control voltages provided by the control layer 110 may be generated by the control layer 110 from a single input voltage 140. Alternatively, the different control voltages may be separately provided from an external control circuit.

Example Bragg Grating-Based Camera Aperture

Figure 2A:
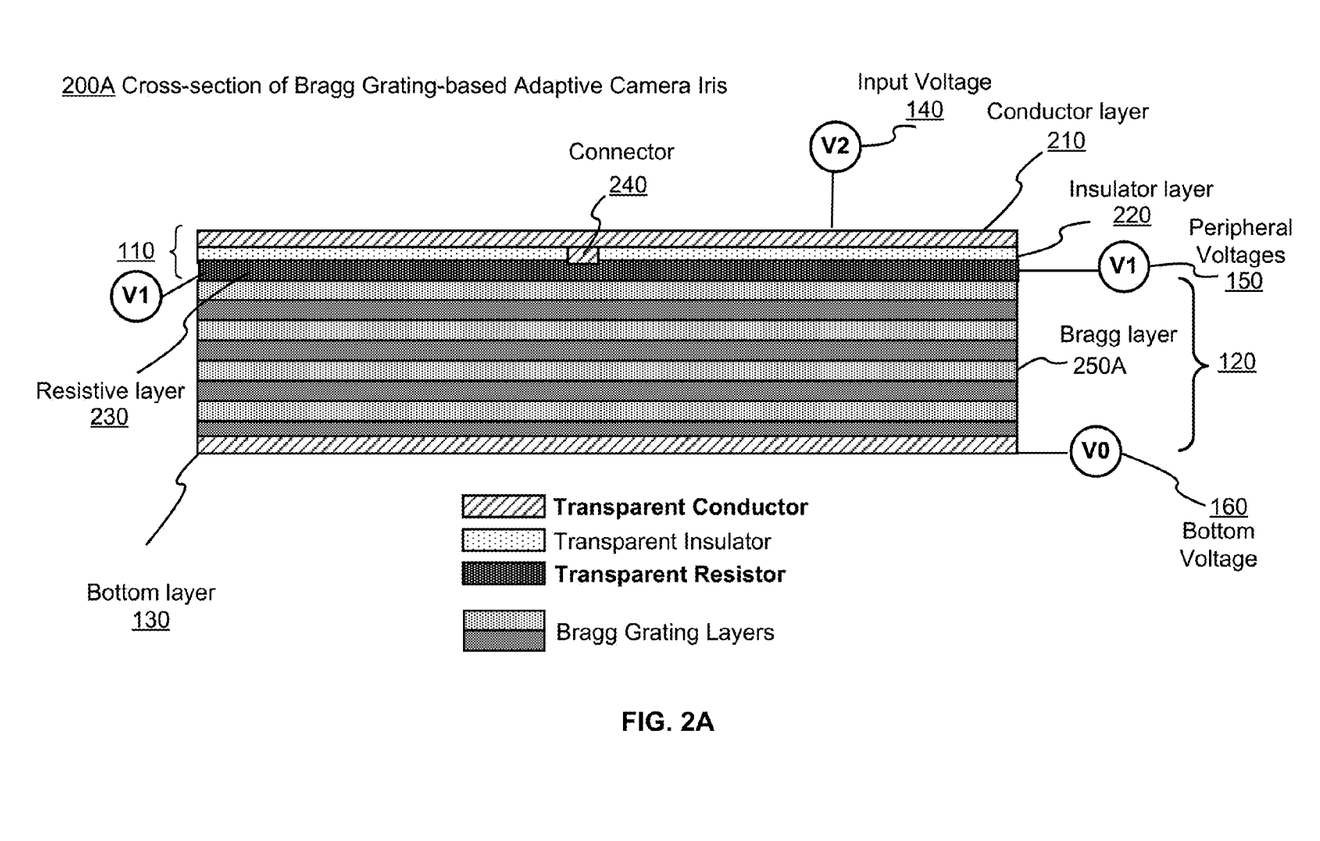
FIG. 2A is a cross-section of Bragg grating-based adaptive camera iris, according to one embodiment.

FIG. 2A is a cross-section 200A of a Bragg grating-based adaptive camera iris, according to one embodiment. In this embodiment, the control layer 110 may comprise at least a conductor layer 210 with a connector 240, an insulator layer 220 below the conductor layer 210, and a resistive layer 230 below the insulator layer 220. Furthermore, in this embodiment, the diaphragm layer 120 may comprise a Bragg layer 250A below the resistive layer 230. A bottom layer 130 may be below the Bragg layer 250A. An input voltage 140 may be applied to the conductor layer 210 and one or more peripheral voltages 150 may applied to the resistive layer 230.

The conductor layer 210 may comprise a transparent conductor (e.g., a voltage plane) that receives the input voltage 140. The input voltage 140 may be dynamically varied to electronically adjust the diameter of a camera aperture to a desired value.

The insulator layer 220 may comprise a transparent insulator that is positioned below the conductor layer 210. The insulator layer 220 may serve as a non-conductive barrier between the conductor layer 210 on top and the resistive layer 230 below. The insulator layer 220 may insulate the resistive layer from the input voltage 140 in certain regions within the resistive layer 230.

The connector 240 may comprise a conductive via through the insulator layer 220 to electrically couple the conductor layer 210 to the resistive layer 230.

The resistive layer 230 may comprise a transparent resistive material. The resistive layer 230 may be coupled to the conductor layer and input voltage V2 140 via the connector 240 at a center region and is connected to a peripheral voltage V1 150 at the edges. As a result, the resistive layer 230 has an applied voltage difference that varies in a radial fashion from the input voltage V2 140 at the connector 240 and the peripheral voltage V1 150 at the edges. In one embodiment, the resistance is uniform throughout the resistance layer 230 so as to provide a linear voltage gradient from the center to the edges. Alternatively, the resistance may vary in different regions to create a non-linear voltage gradient from the center to the edge regions.

In another embodiment, the peripheral voltage V1 may be omitted and the resistive layer 230 may instead have a range of discrete parallel resistances varying with distance from a center of the resistive layer 230. For example, in one embodiment, the resistive layer 230 may comprise a plurality of concentric rings, with the resistance of each ring varying with diameter (e.g., increasing resistance with increasing diameter). In one embodiment, the resistance at different diameters of the resistive layer 230 may be fixed. In another embodiment, the resistances at different diameters of the resistive layer 230 may each comprises variable resistances controllable via one or more voltages. The resistive layer 230 may have resistance in the order of Mega Ohms in one example embodiment.

The Bragg layer 250A may comprise a layer that changes its light transmission and reflectivity characteristics based on a voltage applied across the Bragg layer 250A. Particularly, the Bragg layer may comprise one or more layers that include a broad-band holographic polymer-dispersed liquid crystal reflection grating acting as an active reflection grating when no voltage is applied across the grating layers, and a transmissive element when sufficient voltage is applied across the one or more layers. When an intermediate voltage is applied across the grating layers, the one or more layers may become partially reflective. The grating may be designed to reflect specific wavelength bands as well.

Different regions of the Bragg layer 250A may be independently controlled. In one embodiment, the regions may comprise a continuous material having continuously varying voltages across it. In another embodiment, the Bragg layer 250A may comprise a plurality of concentric rings of different diameters, with each ring independently receiving a voltage across it and each ring having a light reflectivity relating to the voltage. In one embodiment, the light transmission and reflectivity characteristics of the Bragg layer 250A may furthermore depend on the arrangement and dimensions of its sub-layers. In some embodiments, the Bragg layer 250A may include alternating sub-layers, each comprising one or more materials with a range of values of refractive indices and thicknesses. In alternate configurations, the Bragg layer 250A may include one or more grating layers which can at least reflect, partially reflect, transmit, and partially transmit light based on the voltage across the Bragg layer 250A.

In some embodiments, the conductive layer 210, the resistive layer 230, and the grounded bottom layer 130 may create a voltage gradient across the Bragg layer 250A that varies with a distance from the center. Particularly, the resistive layer 230 and the Bragg layer 250A (which may have a substantially constant resistance) may act as a series of voltage dividers in each of the different regions, with the different resistances in the different regions of the resistive layer 230 causing different divided voltages across the Bragg layer 250A in the different regions. For example, in one embodiment, the resistances in different regions of the resistive layer 230 may be selected so as to result in an approximately linear voltage gradient across the Bragg layer 250A that decreases with distance from the center. In alternate embodiments, the resistive layer 230 may have resistances that result in a non-linear voltage gradient across the Bragg layer 250A. For example, the voltage gradient across the Bragg layer 250A may have an increasingly more negative gradient with respect to radius as the radius increases.

In some embodiments, the input voltage 140 may be relatively higher than the bottom voltage 160 and the peripheral voltages 150. For example, the one or more peripheral voltages 150 and the bottom voltage 160 may be set as zero volts (i.e. grounded). In other embodiments, the peripheral voltages 150 may be between the input voltage 140 and the bottom voltage 160. In yet further embodiments, the input voltage 140 and/or the peripheral voltages 150 may be floated.

Example Electrochromic-Based Camera Aperture

Figure 2B:
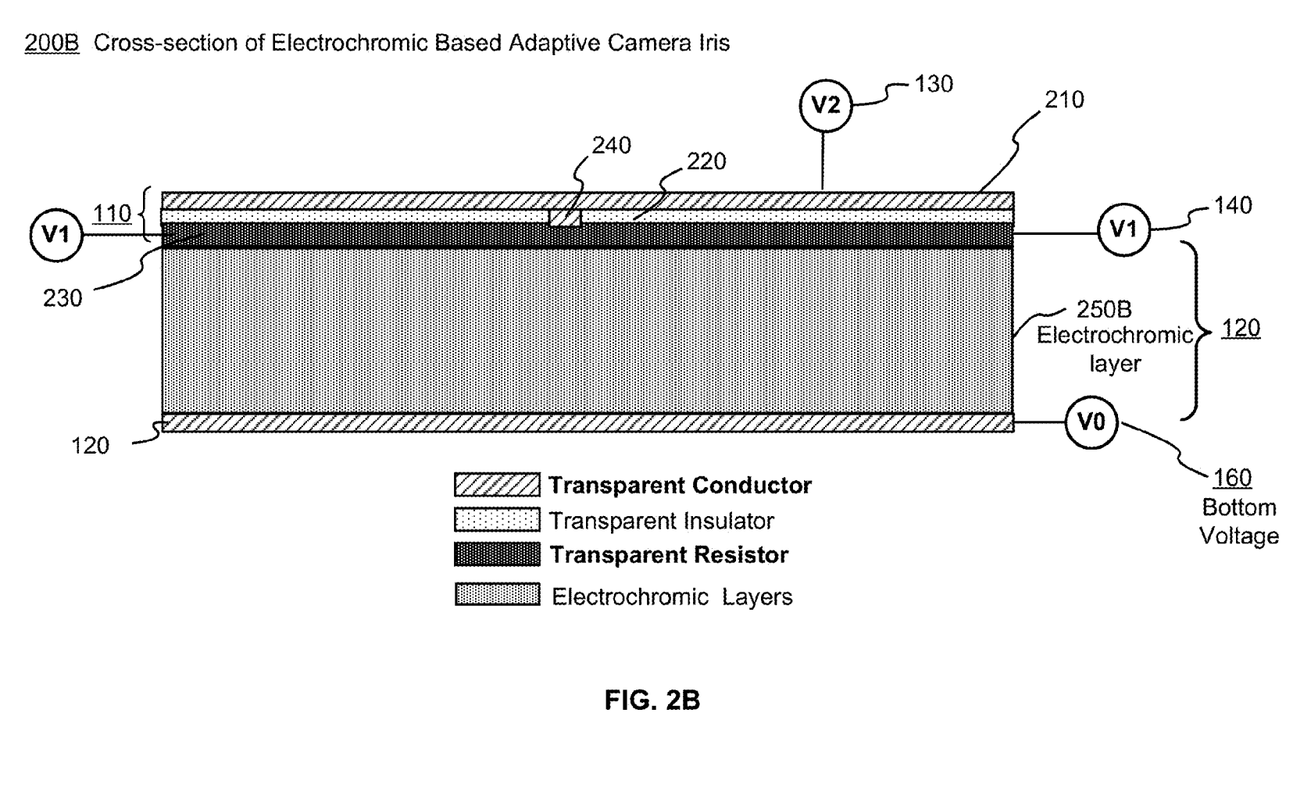
FIG. 2B is a cross-section of Electrochromic-based adaptive camera iris, according to one embodiment.

FIG. 2B is a cross-section of Electrochromic-based adaptive camera iris, according to one embodiment. In the cross-section 200B of FIG. 2B, the control layer 110 is similar to the control layer 110 shown in FIG. 2A, and may include at least a conductor layer 210 with a connector 240, an insulator layer 220 below the conductor layer 210, and a resistive layer 230 below the insulator layer 220. The diaphragm layer 120 in the embodiment of FIG. 2B may comprise an Electrochromic layer 250B below the resistive layer 230 instead of a Bragg grating layer 250A. Also similar to FIG. 2A, an input voltage 140 may be applied to the conductor layer 210, and one or more peripheral voltages 150 may be applied to the resistive layer 230.

The Electrochromic layer 250B may comprise one or more sub-layers that include a broad-band absorptive material acting as an active light absorber (e.g., a diaphragm) when a below-threshold voltage is applied across the one or more sub-layers and may act as a transmissive layer (e.g., an aperture) when an above-threshold voltage is applied across its one or more sub-layers. Thus, the Electrochromic layer 250B may perform a similar function as the Bragg grating layer 250A described in the example of FIG. 2A. Furthermore, as described above with reference to the Bragg layer 250A, the Electrochromic layer 250B may comprise a continuous material or a plurality of independently controllable regions (e.g., concentric rings) that may be controlled to be transmitted or block light so as to electrically control the diameter of the aperture.

The Electrochromic layer may comprise a layer formed by a material that produces a reversible change of color by using bursts of charge to cause electrochemical redox reactions on application of a voltage. Typically, the material used may be based on transition metal oxides (e.g. Tungsten Oxide).

Example Operation

Figure 3A:
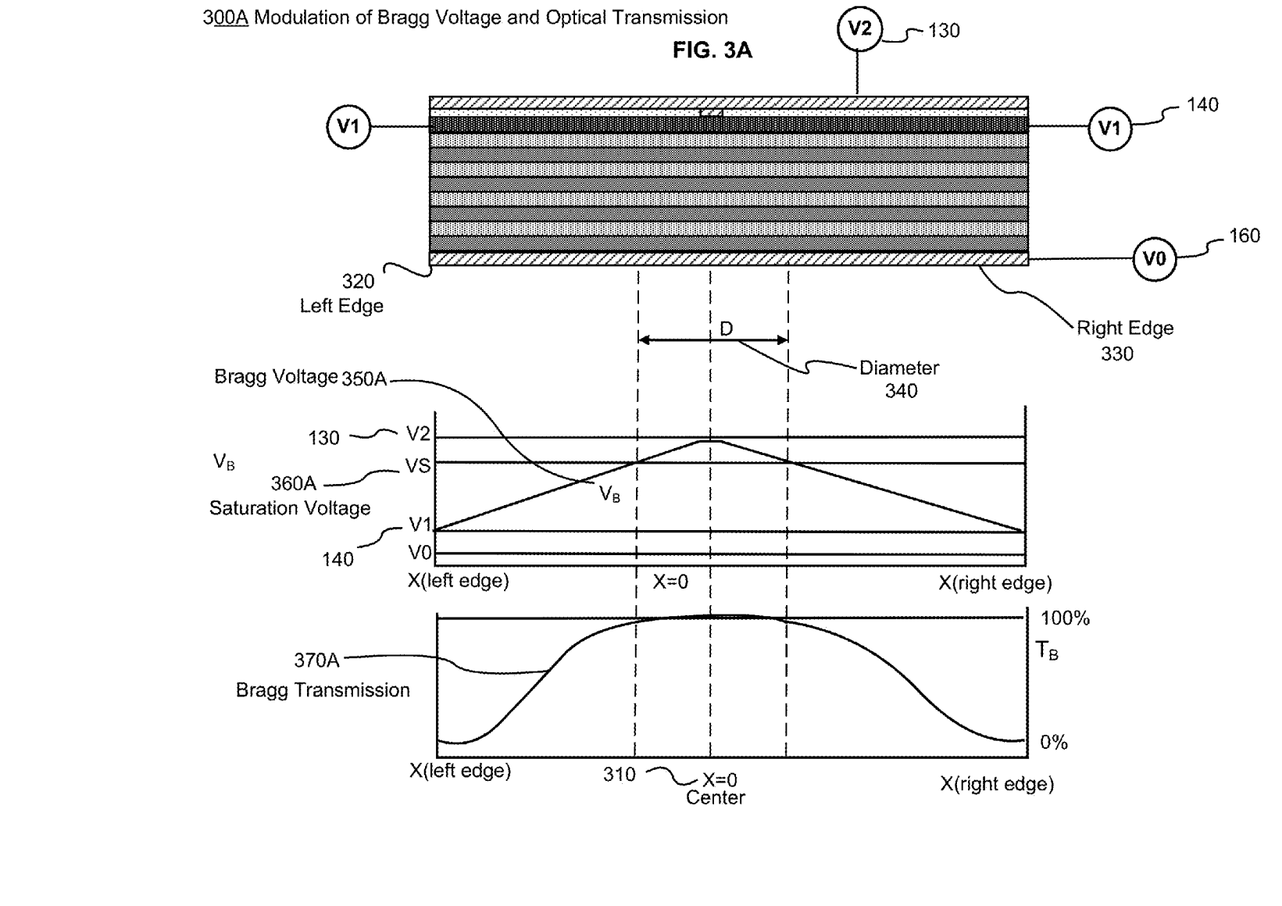
FIG. 3A is a diagram illustrating operation of a Bragg grating-based adaptive camera iris, according to one embodiment.

FIG. 3A illustrates example graphs representing operation of the Bragg grating-based adaptive camera iris of FIG. 2A. In FIG. 3A, the center 310 at X=0 may represent the center of the iris having a left edge at a radius X (left edge) and a right edge at a radius X (right edge). The diameter D 340 may represent a diameter of the aperture 200 of FIG. 2A, which is electrically controllable.

The Bragg voltage 350A may represent the variation of the Bragg voltage across the Bragg layer 250A with respect to distance X from the center 310. The center 310 may correspond to the location of the connector 240 of FIG. 2A. Thus, for example, at the center 310, the Bragg voltage 350A is approximately the input voltage V2 130 because the connector 240 connects the center region of the resistive layer 230 directly to the input voltage V2. At the edges, the Bragg voltage 350A is close to V1 because the edges of the resistive layer 230 are connected to the peripheral voltage V1. In the illustrated embodiment, the Bragg voltage 250A varies approximately linearly between the edges and the center 310. In other embodiments, the Bragg voltage 350A may vary non-linearly between the edges and the center 310. Although the Bragg voltage 350A is illustrated in FIG. 3A as a straight line representing a continuously varying voltage difference, in other embodiments, the Bragg voltage may be discontinuous with discontinuities between the different regions of the Bragg layer 250 having different voltages across it. Thus, for example, the Bragg voltage 350A may comprise a series of step functions in which the voltage is constant across each region (e.g., ring) of the Bragg layer 250.

The saturation voltage 360A may represent a cutoff voltage at or above which the material inside the Bragg layer 250A exceed a threshold transmission. For example, in one embodiment, the Bragg layer 250A may undergo a structural change at this voltage. For example, the structural change may be a change in the alignment of the liquid crystals when the material inside the Bragg layer 250A is a broad-band holographic polymer-dispersed liquid crystal.

The diameter 340 corresponds to the range of distances having Bragg voltages 350A which are at or above the saturation voltage 360A. The Bragg layer 250A may be substantially transparent for the portions of the Bragg layer 250A which are within the diameter 340.

The Bragg transmission factor 370A may represent a percentage of the transmissive characteristic of the Bragg layer 250A. For example, the Bragg transmission factor 370A may approach 100% or near 100% for voltages approaching the input voltage V2 140 and may comprise sufficiently high transmission percentage above the saturation voltage 360A to operate as an aperture. As shown in FIG. 3A, outside the region corresponding to the diameter 340, the Bragg transmission factor 370A may rapidly decrease with increasing distance from the center 310. Thus, outside the diameter D, the Bragg grating layer 250A may be substantially reflective and acts as a diaphragm.

Example Modulation of Electrochromic Voltage

Figure 3B:
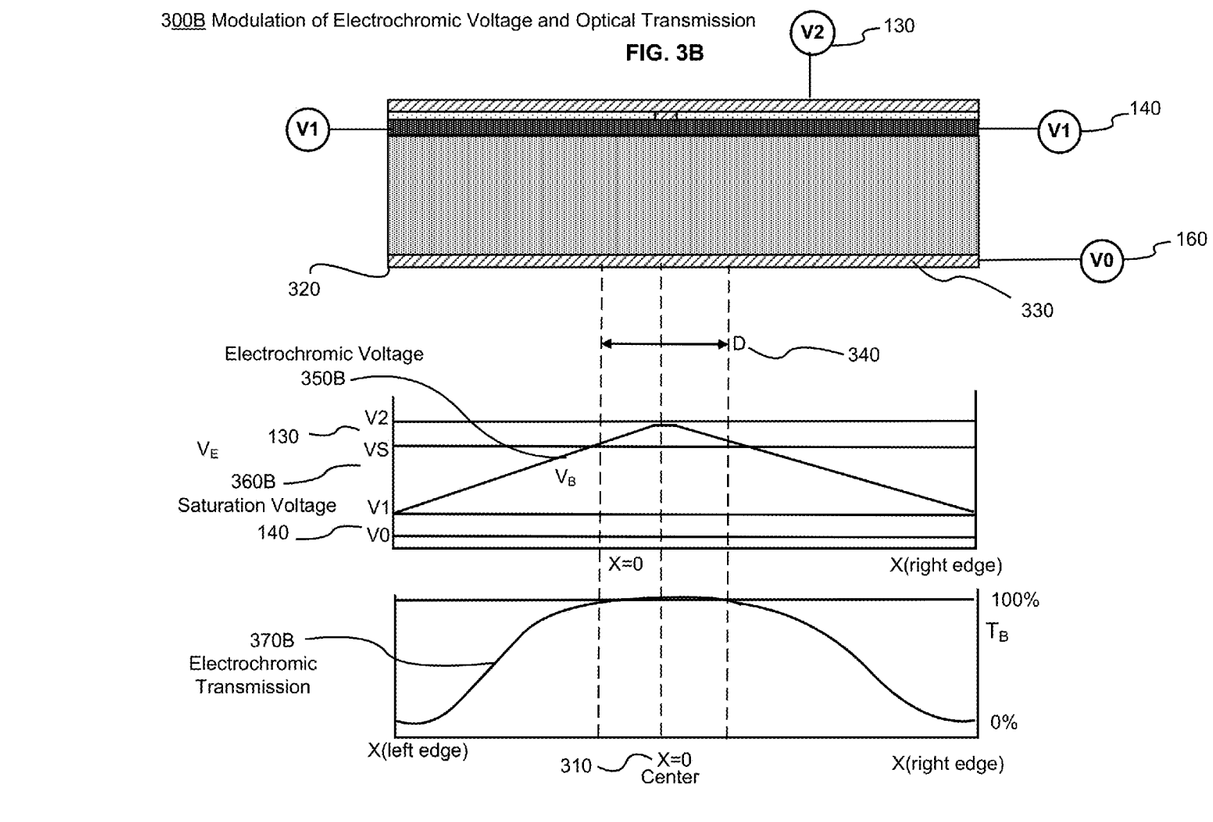
FIG. 3B is a diagram illustrating operation of an Electrochromic-based adaptive camera iris, according to one embodiment.

FIG. 3B illustrates example graphs representing operation of the Electrochromic-based adaptive camera iris of FIG. 2B. As can be seen, the Electrochromic-based adaptive camera iris operates similarly to the Bragg grating-based iris described above.

Variation of Diameter of Adaptive Camera Iris

Figure 4A:
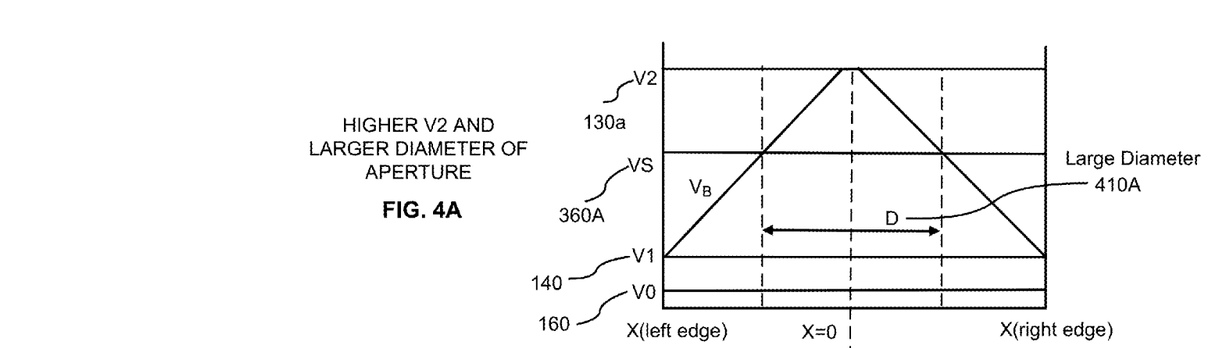
FIG. 4A is a diagram illustrating parameters associated with varying a diameter of the adaptive camera iris with a large diameter, according to one embodiment.
Figure 4B:
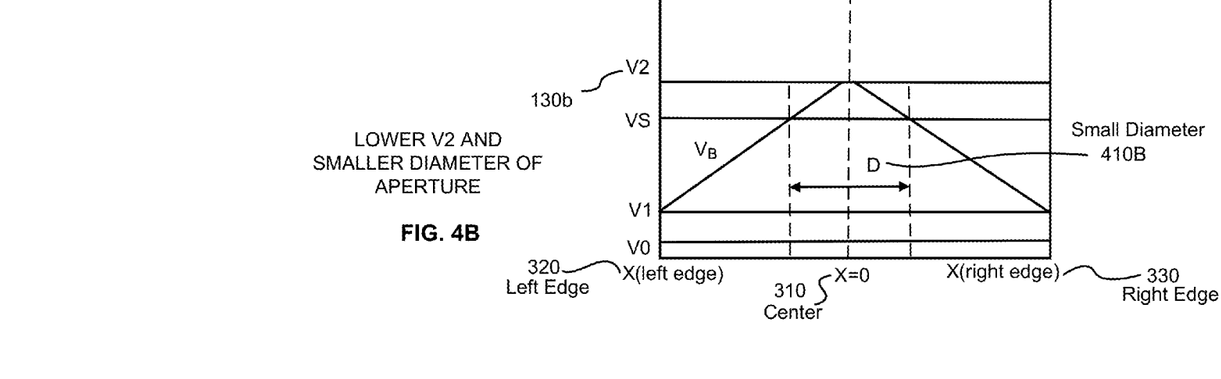
FIG. 4B is a diagram illustrating parameters associated with varying a diameter of the adaptive camera iris with a small diameter, according to one embodiment.

FIGS. 4A and 4B illustrate graphs showing how the diameter of the aperture may be varied by changing the input voltage V2 130. In FIG. 4A, an aperture with a first diameter 410A (e.g., a relatively large diameter) may be achieved by setting the input voltage V2 130 to a first value. In FIG. 4B, an aperture with a second diameter (e.g., a relatively small diameter 410B) may be achieved by setting the input voltage V2 130 to a second value smaller than the first value.

Thus, the diameter 410 may change as a function of at least the input voltage 140. For example, the input voltage 140 may be increased further to result in a larger diameter 410 and may be decreased to result in a smaller diameter 410.

In some configurations, the adaptive camera iris 100 may include a control circuit that can store a look-up-table with a set of values for the input voltage 140 and a corresponding aperture diameter 410 that may be achieved by that input voltage given the saturation voltage 360 and other material characteristics of the diaphragm layer 120.

Adaptive Camera Filter

In some configurations, the diaphragm layer 120 (e.g., a Bragg layer 250A, electrochromic layer 250B, or other layer with similar properties) may be electronically controllable to transmit or block only a predefined range of wavelengths of light in response to the input voltage 140 and pass other wavelengths regardless of the input voltage. Furthermore, in this embodiment the control layer 110 may comprise a voltage plane that can be switched between an on-voltage and off-voltage. Here, when the off-voltage (e.g., a below threshold voltage) is applied, the diaphragm layer 120 blocks light in the predefined range of wavelengths and passes other wavelength, thus producing a filtering effect. When the on-voltage (e.g., above threshold voltage) is applied, the diaphragm layer 120 transmits all wavelengths of light, thus removing the filtering effect.

In other additional embodiment, more than one diaphragm layer 120 with different properties may be layered to independently turn on or off different filtering effects (e.g., filtering different wavelength ranges). Furthermore, layered diaphragm layers 120 may be used to have both an electrically controlled iris and one or more switchable filters in combination.

In yet further embodiments, the bottom voltage 160 may be higher than the input voltage 140 in order to achieve a non-transmissive region closer to the connector 240 and a transmissive region near the edges of the Bragg layer 250A. For example, the diaphragm layer 120 may represent an optical sharpening filter which blocks light near the center.

In another alternate embodiment, the diaphragm layer 120 represent a layer that adaptively transmits light of specific wavelength ranges for color shading correction purposes. For example, the diaphragm layer 120 may transmit light of specific wavelength ranges through the periphery and partially transmit light of specific wavelength ranges through the center. The diaphragm layer 120 may perform additional corrective operations including, but not restricted to, relative illumination, lens shading, etc. For example, the iris 100 may be configured such that some light passes through the center (e.g., 50%) but more light passes through the perimeter (e.g., >95%). In a different configuration, the bottom layer 130 may be controllable with reference to the input voltage 140 to provide different effects.

In yet another embodiment, the input voltage 140 or the peripheral voltages 150 may be floated. In this embodiment, the Bragg layer 250A (or Electrochromic layer 250B) may experience a uniform field, thus causing the camera iris of to act as a uniform neutral density filter. The uniform density filter may be actively controlled or turn on/off based on the input voltage 140 or peripheral voltage 150 that is not floated.

Alternative Iris Geometries

In other alternative embodiments, the geometry of the adaptive iris may have a square or rectangular perimeter. In these embodiments, the connector 240 may be a line rather than a dot such that it forms a line of symmetry. The iris 100 may be transmissive near the center line and non-transmissive near the edges or vice versa.

In yet another embodiment that may operate with any of the above described geometries, the conductor layer 210 and the insulator layer 220 may be omitted and the left and right edges of the resistive layer 230 may be set to V2 and V1 respectively (or vice versa). For example, conductive strips may be placed along the edges that electrically contacts resistive layer 230, thereby realizing a voltage gradient from one edge to the other. This may result in a sloping transmission function in which one edge is more transmissive than the other edge.

Example Camera

Figure 5:
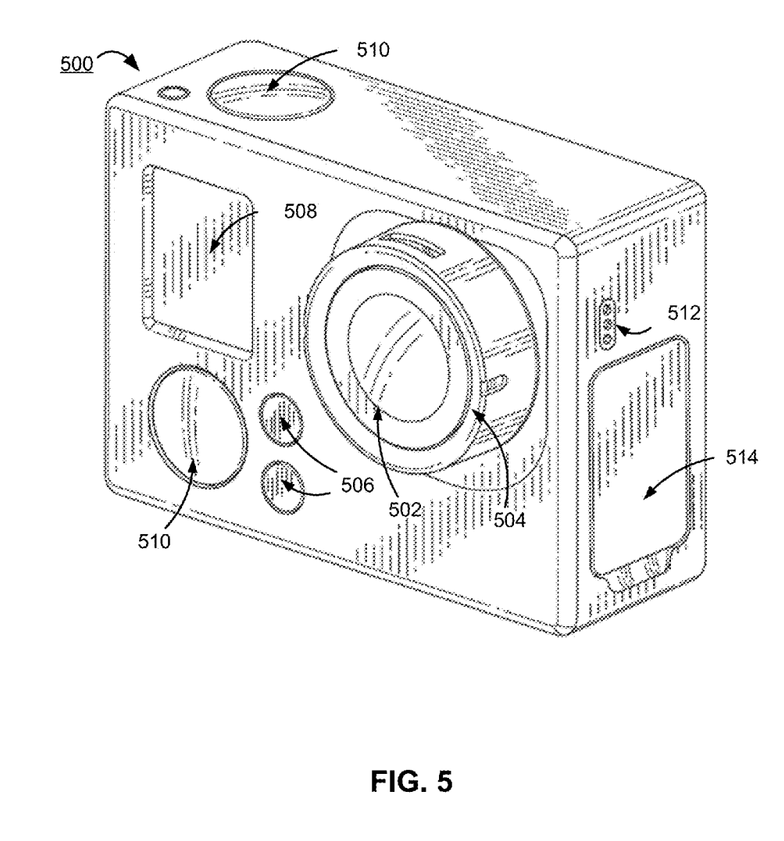
FIG. 5 is an illustration of example camera, according to one embodiment.

FIG. 5 illustrates an embodiment of an example camera 500 that includes the adaptive camera iris 100 described above with reference to FIG. 1. The camera 500 comprises a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera 500 is configured to capture images and video, and to store captured images and video for subsequent display or playback. As illustrated, the camera 500 includes a lens assembly 502 comprising a plurality of lens elements configured to receive light incident upon the lens and to direct received light onto an image sensor internal to the lens assembly. The adaptive camera iris 100 is positioned within the lens assembly 502 to control how much light reaches the image sensor.

The camera 500 can include various indicators, including the LED lights 506 and the LED display 508. The camera 500 can also include buttons 510 configured to allow a user of the camera to interact with the camera, to turn the camera on, and to otherwise configure the operating mode of the camera. The camera 500 can also include a microphone 512 configured to receive and record audio signals in conjunction with recording video. The side of the camera 500 includes an I/O interface 514.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for the disclosed embodiments. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An electronically controlled camera iris device comprising:
   a transparent conductor layer to supply an input voltage to control a diameter of an aperture;
   a transparent resistance layer below the transparent conductor layer, the transparent resistance layer receiving the input voltage at a connector point in a center region of the transparent resistance layer and receiving a peripheral voltage at edges located outside the center region of the transparent resistance layer, the transparent resistance layer providing varying control voltages generated from the received input voltage and the peripheral voltages in different regions that decrease with a distance from the connector point; and
   a diaphragm layer receiving the varying control voltages from the transparent resistance layer, the diaphragm layer to operate as a diaphragm in one or more outer regions to block light in response to a corresponding control voltage being below a voltage threshold and to operate as the aperture in one or more inner regions to transmit the light in response to the corresponding control voltage being above the voltage threshold.

2. The electronically controlled camera iris device of claim 1, wherein the respective control voltages increase with an increase in the input voltage and causes the diameter of the one or more inner regions that receive respective control voltages exceeding the voltage threshold to increase.

3. The electronically controlled camera iris device of claim 1, wherein the transparent resistance layer comprises a continuous resistive material between the input voltage and the peripheral voltage.

4. The electronically controlled camera iris device of claim 1, wherein the transparent resistance layer comprises a first plurality of concentric rings having the one or more resistances that increase with the distance from the center point, and wherein the diaphragm layer comprises a plurality of concentric rings each receiving one of the respective control voltages.

5. The electronically controlled camera iris device of claim 1, wherein the diaphragm layer comprises a Bragg layer, the Bragg layer further comprising one or more layers of a broad-band holographic polymer-dispersed liquid crystal.

6. The electronically controlled camera iris device of claim 1, wherein the diaphragm layer comprises an Electrochromic layer, the Electrochromic layer further comprising one or more layers of a broad-band absorptive material.

7. A camera comprising:
a camera body;
a lens assembly to direct light to an image sensor, the lens assembly comprising a plurality of lens elements and an electronically controlled iris, the electronically controlled iris comprising:
a transparent conductor layer to supply an input voltage to control a diameter of an aperture;
a transparent resistance layer below the transparent conductor layer, the transparent resistance layer receiving the input voltage at a connector point in a center region of the transparent resistance layer and receiving a peripheral voltage at edges located outside the center region of the transparent resistance layer, the transparent resistance layer providing varying control voltages generated from the received input voltage and the peripheral voltages in different regions that decrease with a distance from the connector point; and
a diaphragm layer receiving the varying control voltages from the transparent resistance layer, the diaphragm layer to operate as a diaphragm in one or more outer regions to block light in response to a corresponding control voltage being below a voltage threshold and to operate as the aperture in one or more inner regions to transmit the light in response to the corresponding control voltage being above the voltage threshold.

8. The camera of claim 7, wherein the respective control voltages increase with an increase in the input voltage and causes the diameter of the one or more inner regions that receive the respective control voltages exceeding the voltage threshold to increase.

9. The camera of claim 7, wherein the transparent resistance layer comprises a continuous resistive material between the input voltage and the peripheral voltage.

10. The camera of claim 7, wherein the transparent resistance layer comprises a first plurality of concentric rings having the one or more resistances that increase with the distance from the center point, and wherein the diaphragm layer comprises a plurality of concentric rings each receiving one of the respective control voltages.

11. The camera of claim 7, wherein the diaphragm layer comprises a Bragg layer, the Bragg layer further comprising one or more layers of a broad-band holographic polymer-dispersed liquid crystal.

12. The camera of claim 7, wherein the diaphragm layer comprises an Electrochromic layer, the Electrochromic layer further comprising one or more layers of a broad-band absorptive material.

13. The camera of claim 7, wherein the diaphragm layer is configured to transmit a range of wavelengths of the light incident on the first region of the diaphragm layer and block wavelengths of the light outside the range, the range of wavelengths smaller than a visible spectrum.

14. The camera of claim 7, wherein the diaphragm layer is configured to transmit a range of wavelengths of the light incident on the first region of the diaphragm layer, the range of wavelengths comprising a full visible spectrum.

15. A lens assembly comprising:
a plurality of lens elements; and
an electronically controlled iris, the electronically controlled iris comprising:
a transparent conductor layer to supply an input voltage to control a diameter of an aperture;
a transparent resistance layer below the transparent conductor layer, the transparent resistance layer receiving the input voltage at a connector point in a center region of the transparent resistance layer and receiving a peripheral voltage at edges located outside the center region of the transparent resistance layer, the transparent resistance layer providing varying control voltages generated from the received input voltage and the peripheral voltages in different regions that decrease with a distance from the connector point; and
a diaphragm layer receiving the varying control voltages from the transparent resistance layer, the diaphragm layer to operate as a diaphragm in one or more outer regions to block light in response to a corresponding control voltage being below a voltage threshold and to operate as the aperture in one or more inner regions to transmit the light in response to the corresponding control voltage being above the voltage threshold.

16. The lens assembly of claim 15, wherein the diaphragm layer comprises a Bragg layer, the Bragg layer further comprising one or more layers of a broad-band holographic polymer-dispersed liquid crystal.

17. The lens assembly of claim 15, wherein the diaphragm layer comprises an Electrochromic layer, the Electrochromic layer further comprising one or more layers of a broad-band absorptive material.

18. The lens assembly of claim 15, wherein the diaphragm layer is configured to transmit a range of wavelengths of the light incident on the first region of the diaphragm layer and block wavelengths of the light outside the range, the range of wavelengths smaller than a visible spectrum.

19. The lens assembly of claim 15, wherein the diaphragm layer is configured to transmit a range of wavelengths of the light incident on the first region of the diaphragm layer, the range of wavelengths comprising a full visible spectrum.

20. The lens assembly of claim 15, wherein the transparent resistance layer comprises a first plurality of concentric rings having the one or more resistances that increase with the distance from the center point, and wherein the diaphragm layer comprises a plurality of concentric rings each receiving one of the respective control voltages.

* * * * *